(No Model.)
A. H. MERSHON.
CONDUIT FOR TELEGRAPH, TELEPHONE, AND OTHER WIRES.
No. 247,207. Patented Sept. 20, 1881.
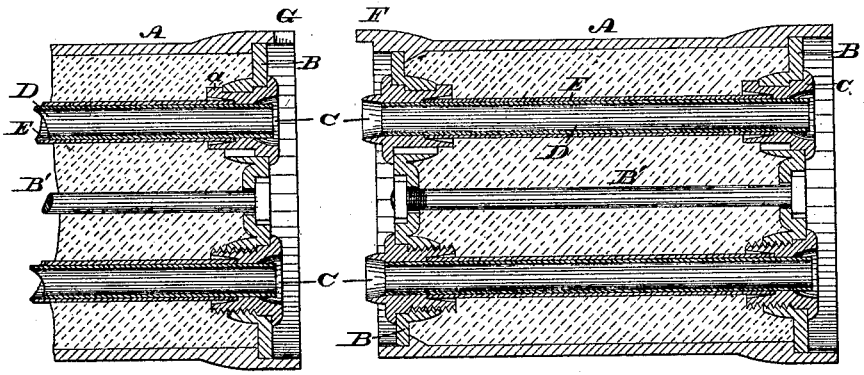
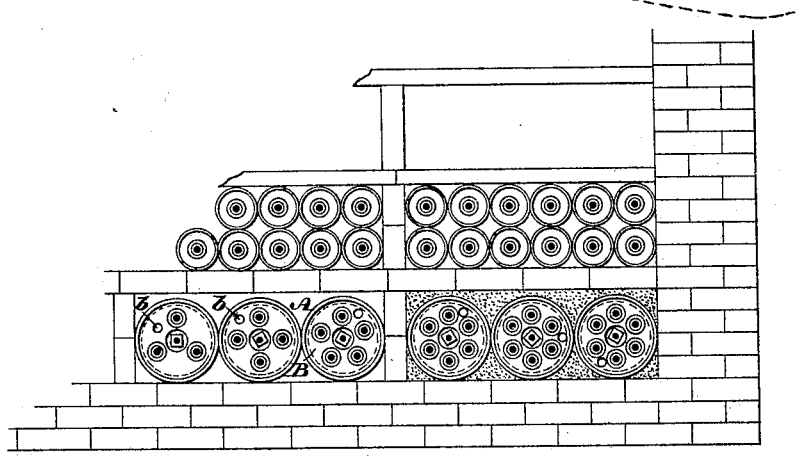

UNITED STATES PATENT OFFICE.

ALBERT H. MERSHON, OF PHILADELPHIA, PENNSYLVANIA.

CONDUIT FOR TELEGRAPH, TELEPHONE, AND OTHER WIRES.

SPECIFICATION forming part of Letters Patent No. 247,207, dated September 20, 1881

Application filed June 15, 1881. (No model.)

*To all whom it may concern:*

Be it known that I, ALBERT H. MERSHON, a citizen of the United States, residing in the city and county of Philadelphia, and State of Pennsylvania, have invented a new and useful Improvement in Conduits for Telegraph, Telephone, and other Wires, which improvement is fully set forth in the following specification and accompanying drawings, in which—

Figure 1 is a central longitudinal section of the conduit embodying my invention. Fig. 2 is an end view thereof laid in series, tiers, &c.

Similar letters of reference indicate corresponding portions in the two figures.

My invention consists of a conduit for electric wires which may be conveniently and securely laid, and in which the wires may be easily run, and are thoroughly insulated and guarded and prevented from injury, as will be hereinafter fully set forth.

Referring to the drawings, A represents pipes or tubes, the desired numbers of which are laid end to end on suitable supports, or, if desired, in cement, &c., within suitable brick-work or masonry, casings, &c., on or in the ground along the line required for the electric wires, said tube A being formed of terra-cotta, metal, &c., as most suitable. At each end of a tube is a head, B, to which are fitted tubular couplings C, which, in adjacent sections of the tubes, are adapted to enter each other and connect the sections, said couplings being secured to the heads by projecting lugs $a$ on their inner ends, or by being screwed to the heads, or employment of other proper means. Within the tube are passed pipes D, formed of glass or other insulated material, their ends being fitted in and supported on the couplings C, and coming in contact or connected in contiguous sections of the tube, so as to form a continuous line of pipe, within which the electric wires are run, and into which insulating fluid may be passed as desired.

Surrounding the pipes D are covering-pipes E, of metal or other suitable material, and the space of the tube A is filled with cement, concrete, &c., completely filling said tube from head to head, and closing around the exterior pipe, E, access being had to the tube for filling purposes, preferably through suitable openings, $b$, in the heads. (See Fig. 2.) The heads abut against shoulders $c$ in the inner face of the tube, and are firmly connected to the tube by means of one or more screw bolts or rods, B', whereby each section of the tube presents a strong structure.

In order that the sections may register, and thus be conveniently and properly fitted to each other, they are provided with lugs F and sockets G, which form matched joints, which, when the tubes are laid, are cemented and closed, thus causing the proper retention of the conduit in position.

It will be seen that the glass or insulated pipes D are well protected by the covering-pipes E, and the latter are guarded from moisture, &c., by the filling or packing of the tube A. The heads B firmly support the pipes and prevent strain on the wires, and, furthermore, sustain the tubes A, and as said heads are firmly connected to the tubes and the latter are united by the couplings C and match-joints F G, the conduit, after being properly laid, remains in position and is prevented from shifting.

The conduit as constructed may be laid in desired localities, and as the line is extended the wires may be run through the glass pipe, this being accomplished by pushing, pulling, or otherwise forcing or passing the wires through them, and proper testing-stations or man-holes will be employed at intervals for access to the conduits and wires necessary in such cases.

It will also be seen that the pipes are thoroughly insulated one from the other, whereby induction effects are prevented.

Having thus described my invention, what I claim as new, and desire to secure by Letters Patent, is—

1. A tube or tubes, A, in combination with the pipes for the wires, and with interlocking shouldered couplings on the ends of the respective sections of said pipes, the couplings of each section fitting into or upon the corresponding couplings of the adjoining sections, substantially as set forth.

2. Tube A, in combination with heads B and rod or bolt B', whereby said heads are clamped in position at the ends of the tube, substantially as set forth.

3. Couplings C, adapted to fit into and over one another, and provided with shoulders $a$, in combination with heads B, which abut against said shoulders and tube A, substantially as set forth.

4. Inner tube, D, and outer tube, E, in combination with couplings C, heads B, and tube A, substantially as set forth.

5. Tubes A, provided with interlocking lugs F and socket G, in combination with conduit-pipes inclosed within said tubes, and containing insulated wires, and with heads B and screw-bolt B', substantially as set forth.

A. H. MERSHON.

Witnesses:
JOHN A. WIEDERSHEIM,
F. COOPER.